(12) United States Patent
Lee et al.

(10) Patent No.: US 11,598,058 B2
(45) Date of Patent: Mar. 7, 2023

(54) WARNING SIGN DEVICE

(71) Applicant: ASUSTeK COMPUTER INC., Taipei (TW)

(72) Inventors: Yen-Chun Lee, Taipei (TW); Hung-Ling Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 968 days.

(21) Appl. No.: 16/410,087

(22) Filed: May 13, 2019

(65) Prior Publication Data

US 2019/0360164 A1    Nov. 28, 2019

(30) Foreign Application Priority Data

May 22, 2018   (CN) .......................... 201820763233.0

(51) Int. Cl.
| | | |
|---|---|---|
| *E01F 9/65* | (2016.01) | |
| *E01F 9/608* | (2016.01) | |
| *E01F 9/654* | (2016.01) | |
| *E01F 9/692* | (2016.01) | |
| *E01F 9/662* | (2016.01) | |
| *H02J 7/00* | (2006.01) | |
| *H04N 7/18* | (2006.01) | |

(52) U.S. Cl.
CPC ............... *E01F 9/608* (2016.02); *E01F 9/65* (2016.02); *E01F 9/654* (2016.02); *E01F 9/662* (2016.02); *E01F 9/692* (2016.02); *H02J 7/0042* (2013.01); *H04N 7/183* (2013.01)

(58) Field of Classification Search
CPC .......... H02J 7/042; H04N 7/183; E01F 9/608; E01F 9/65; E01F 9/654; E01F 9/662; E01F 9/692

USPC ......................................... 404/6–9; 116/63 T
See application file for complete search history.

(56) References Cited

U.S. PATENT DOCUMENTS

| | | | | |
|---|---|---|---|---|
| 3,135,235 A | * | 6/1964 | Romano | ................ E01F 9/688 |
| | | | | 116/63 P |
| 4,875,028 A | * | 10/1989 | Chou | ....................... B60Q 7/00 |
| | | | | 116/63 T |
| 4,952,910 A | * | 8/1990 | Straten | ..................... B60Q 7/00 |
| | | | | 340/474 |
| 6,718,670 B2 | * | 4/2004 | Wang | ..................... B60Q 7/005 |
| | | | | 116/63 T |
| 7,158,020 B2 | * | 1/2007 | Grady, Jr. | ................ G09F 9/33 |
| | | | | 116/63 T |
| 7,370,602 B2 | * | 5/2008 | Greves | .................. B60Q 7/005 |
| | | | | 116/63 P |

(Continued)

FOREIGN PATENT DOCUMENTS

| CN | 200946248 Y | 9/2007 |
|---|---|---|
| CN | 201713769 U | 1/2011 |

(Continued)

OTHER PUBLICATIONS

Chinese language office action dated Nov. 28, 2018, issued in application No. CN 201820763233.0.
Translation of relevant paragraphs of Chinese office action.

*Primary Examiner* — Raymond W Addie
(74) *Attorney, Agent, or Firm* — McClure, Qualey & Rodack, LLP

(57) ABSTRACT

The invention provides a warning sign device. The warning sign device comprises a sign body and a continuous track assembly. The continuous track assembly is disposed on the sign body.

18 Claims, 7 Drawing Sheets

(56) References Cited

U.S. PATENT DOCUMENTS

| | | | |
|---|---|---|---|
| 7,400,228 B2 * | 7/2008 | Abeyta | G08B 7/068 116/63 P |
| 2002/0154947 A1 * | 10/2002 | Farritor | E01F 9/654 404/9 |
| 2012/0188071 A1 * | 7/2012 | Ho | B60Q 7/00 116/63 T |
| 2016/0144780 A1 * | 5/2016 | Chiang | B60Q 7/005 116/63 T |
| 2018/0326983 A1 * | 11/2018 | Lee | B60Q 7/00 |
| 2019/0106850 A1 * | 4/2019 | Fiordi | A01G 9/28 |

FOREIGN PATENT DOCUMENTS

| | | |
|---|---|---|
| CN | 206306935 U | 7/2017 |
| CN | 206639534 U | 11/2017 |

\* cited by examiner

WARNING SIGN DEVICE

CROSS-REFERENCE TO RELATED APPLICATION

This application claims the priority benefit of China Application Serial No. 201820763233.0, filed on May 22, 2018. The entirety of the above-mentioned patent application is hereby incorporated by reference herein and made a part of specification.

BACKGROUND OF THE INVENTION

Field of the Invention

The invention relates to a warning sign device and, more particularly, to a warning sign device used in traffic.

Description of the Related Art

Car accidents can always happen no matter how careful the drivers are. A triangle warning sign is usually used to indicate the hazard, obstacle or condition for the drivers on roads. When a traffic accident happens, the triangle warning sign is placed at the road before the accident scene and keeps a certain distance to the scene in order to warn the coming vehicles. This keeps the accident scene complete and also avoids the accident involving persons from overtaking collision by coming vehicles.

BRIEF SUMMARY OF THE INVENTION

According to the first aspect of the disclosure, a warning sign device is provided herein. The warning sign device comprises: a sign body; and at least one continuous track assembly, disposed on the sign body.

Whereby, when the continuous track assembly drives the sign body to move to a position needing warning, since the continuous track assembly has large contact surface for contacting the ground, the ground gripping force of the continuous track assembly is improved. Therefore, whether the continuous track assembly is moving or staying in a position, the warning sign device is stable.

Other functions related to the invention and detailed content of embodiments are illustrated as follows in conjunction with the drawings.

BRIEF DESCRIPTION OF THE DRAWINGS

To more clearly describe the technical solutions in the embodiments of this application or in the prior art, the following will briefly introduce the drawings required for describing the embodiments or the prior art. It is apparent that the drawings in the following description are only some embodiments described in this application, and a person of ordinary skill in the art may obtain other drawings on the basis of these drawings without any creative effort.

DETAILED DESCRIPTION OF THE EMBODIMENTS

Unless otherwise particularly specified, the positional relationships described in the following embodiments, including upper, lower, left and right, are based on the directions in which the components are depicted in the figures.

Figure 1:
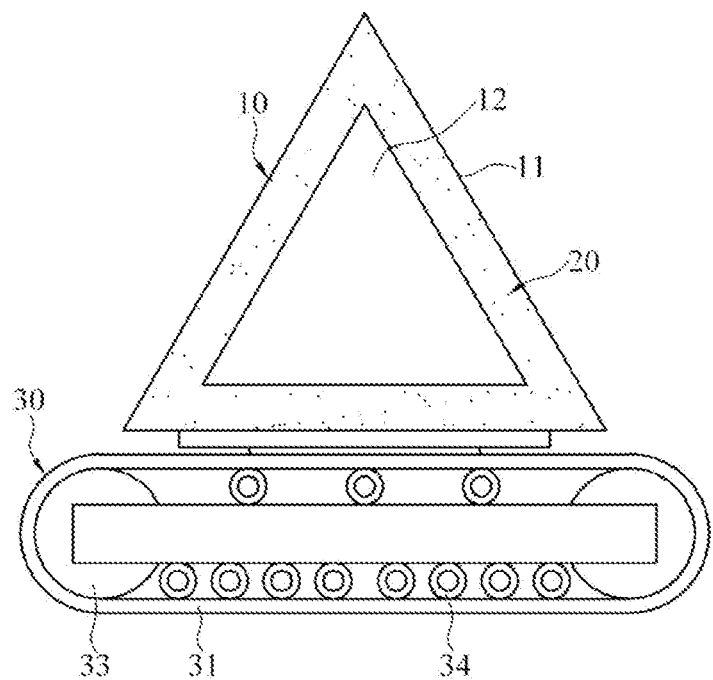
FIG. 1 is a schematic view of an embodiment of a warning sign device of the invention.

Referring to FIG. 1, FIG. 1 is a schematic view of an embodiment of a warning sign device of the invention. The warning sign device drawn in FIG. 1 comprises a warning element 20 and a continuous track assembly 30.

In the embodiment, the continuous track assembly 30 is disposed on the sign body 10. Hereby, the continuous track assembly 30 drives the sign body 10 to move to a position where a warning sign is needed. The continuous track assembly 30 provides good stability when the warning sign device is moving or stands firmly at the position.

Specifically, the sign body 10 is a fixed type sign body 10 or a foldable sign body 10. Referring to FIG. 1, the fixed type sign body 10 is a triangle with a flat plate structure. In the embodiment, the sign body 10 has three side edges 11 and connects each other to form a triangle. The continuous track assembly 30 is disposed on one of the three side edges 11. Therefore, the sign body 10 stands on the continuous track assembly 30.

In one embodiment, also referring to FIG. 1, the warning sign device further comprises a warning element 20. The warning element 20 is disposed on the sign body 10 and is configured to provide a warning function.

Further, continuing to refer to FIG. 1, in an embodiment, the warning element 20 is a light reflecting element or a light emitting element that electrically emits light. In this embodiment, the single body type sign body 10 includes a face portion 12 surrounded by the three side edges 11. Herein, the warning element 20 is disposed on the face portion 12 or the three side edges 11 of the sign body 10, but is not limited here. When the continuous track assembly 30 is working, the sign body 10 is driven to move to a position where a warning is needed, and the warning element 20 on the sign body 10 provides a warning function such as light reflecting or light emitting.

Also referring to FIG. 1, in one embodiment, the continuous track assembly 30 comprises at least a continuous track 31 and two rotating wheels 33, and the continuous track 31 surrounds the rotating wheels 33. In other embodiments, when a big warning sign device is required, that means the length or the width of the continuous track 31 are also required to be increased, a plurality of idle wheels 34 is additionally disposed between the two rotating wheels 33 to support the continuous track 31.

Figure 4:
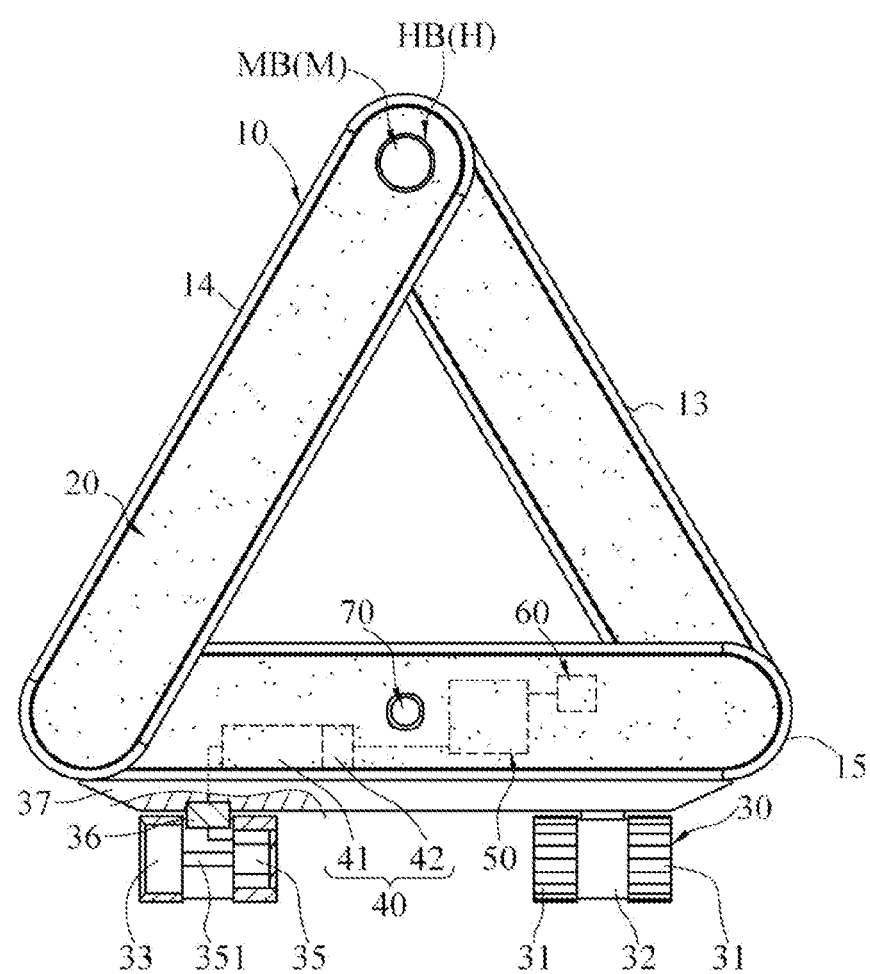
FIG. 4 is a schematic view of a using state of the embodiment of FIG. 2.

More specifically, referring to FIG. 1 and FIG. 4, in one embodiment, the continuous track assembly 30 comprises two continuous tracks 31 and a base body 32. The two continuous tracks 31 are surrounding the base body 32, and the sign body 10 is fixed on the base body 32. In order for the continuous track 31 to easily rotate and drives the sign body 10 to move on, the rotating wheels 33 are pivotally disposed on the base body 32, and the continuous track 31 is surrounding the two rotating wheels 33 for moving.

In one embodiment, referring to FIG. 2 to FIG. 6, the sign body 10 is foldable. In the embodiment, the sign body 10 comprises a foldable first side element 13, a second side element 14 and a third side element 15. Specifically, the first side element 13, the second side element 14 and the third side element 15 are long rod bodies with similar shape and the same length. Herein, one end of the first side element 13 and one end of the second side element 14 are pivotally disposed at two ends of the third side element 15 and are located on two opposite sides of the third side element 15 respectively, and the other ends of the first side element 13 and the second side element 14 are separately connected each other. The first side element 13, the second side element 14, and the third side element 15 jointly form a triangle when the first side element 13 and the second side element 14 are combined.

Herein, when the first side element 13, the second side element 14 and the third side element 15 overlap with each other, the sign body 10 is in a closing state.

Figure 5:
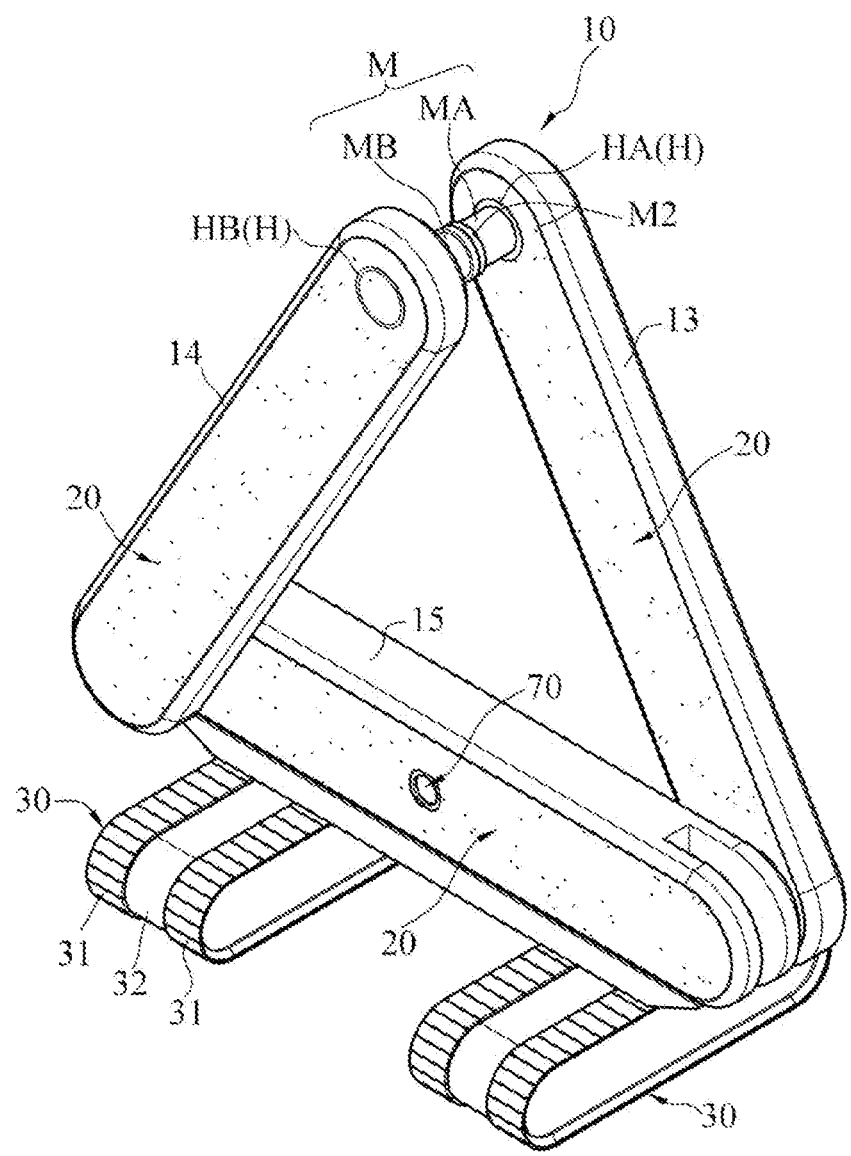
FIG. 5 is a three-dimensional schematic view of the embodiment of FIG. 4.

Referring to FIG. 4 and FIG. 5, one end of the first side element 13 is pivoted to one end of a long side of the third side element 15 and one end of the second side element 14 is pivoted to the other end of the long side of the third side element 15. The other end of the first side element 13 and the other end of the second side element 14 are detachably connected, and the other end of the first side element 13 and the other end of the second side element 14 overlap each other when the first side element 13 is connected with the second side element 14. Herein, when the other end of the first side element 13 and the other end of the second side element 14 respectively rotate toward a direction away from the third side element 15 and are connected with each other, the first side element 13, the second side element 14 and the third side element 15 jointly form a triangle.

Figure 6:
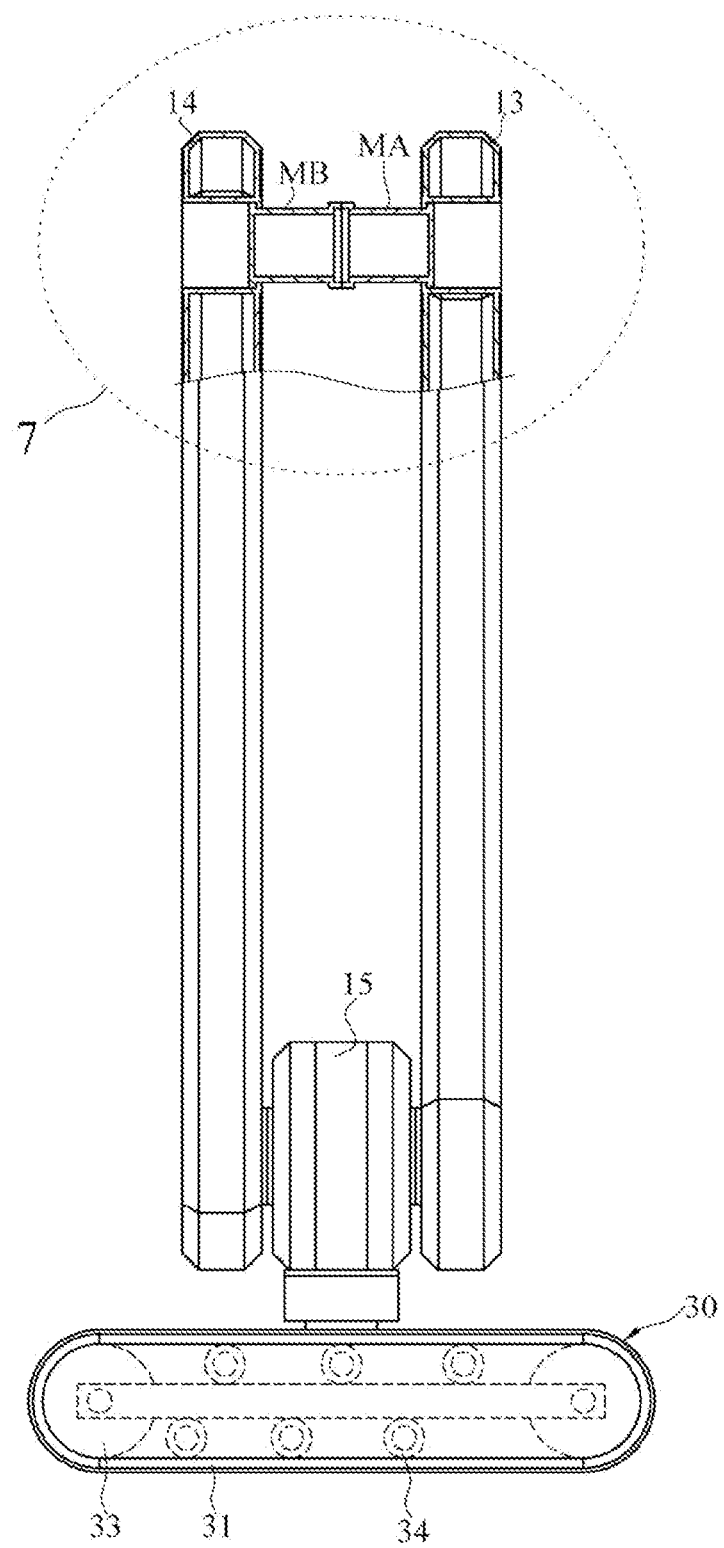
FIG. 6 is a cross-sectional view of the embodiment of FIG. 5.

Further referring to FIG. 5 and FIG. 6, in one embodiment, the other end of the first side element 13 and the other end of the second side element 14 are detachably connected by a magnetic manner. Herein, the other end of the first side element 13 and the other end of the second side element 14 are respectively provided with a magnetic element M (in an embodiment, a magnet and an electromagnet). When the magnetic element M on the first side element 13 is overlapping and connected with the magnetic element M, the first side element 13, the second side element 14, and the third side element 15 jointly form a stable triangle.

In order to minimize the dimension of the sign body 10 in a closing state, the magnetic elements M on the first side element 13 and the second side element 14 are stretchable. In one embodiment, the magnetic elements M on the first side element 13 and the second side element 14 are able to stretch out when the other end of the first side element 13 is overlapping and connected with the other end of the second side element 14, the magnetic elements M on the first side element 13 and the second side element 14 are able to draw back when the sign body 10 is in a closing state.

Specifically, continuing to refer to FIG. 6, the other end of the first side element 13 and the other end of the second side element 14 are respectively provided with a via hole H, the magnetic elements M are movably disposed in the via holes H respectively. In an embodiment, the other end of the first side element 13 is provided with a first via hole HA, and the other end of the second side element 14 is provided with a second via hole HB. Herein, the magnetic elements M comprise a first magnetic element MA and a second magnetic element MB with a magnetic pole different from that of the first magnetic element MA, the first magnetic element MA is disposed in the first via hole HA, and the second magnetic element MB is disposed in the second via hole HB.

Figure 3:
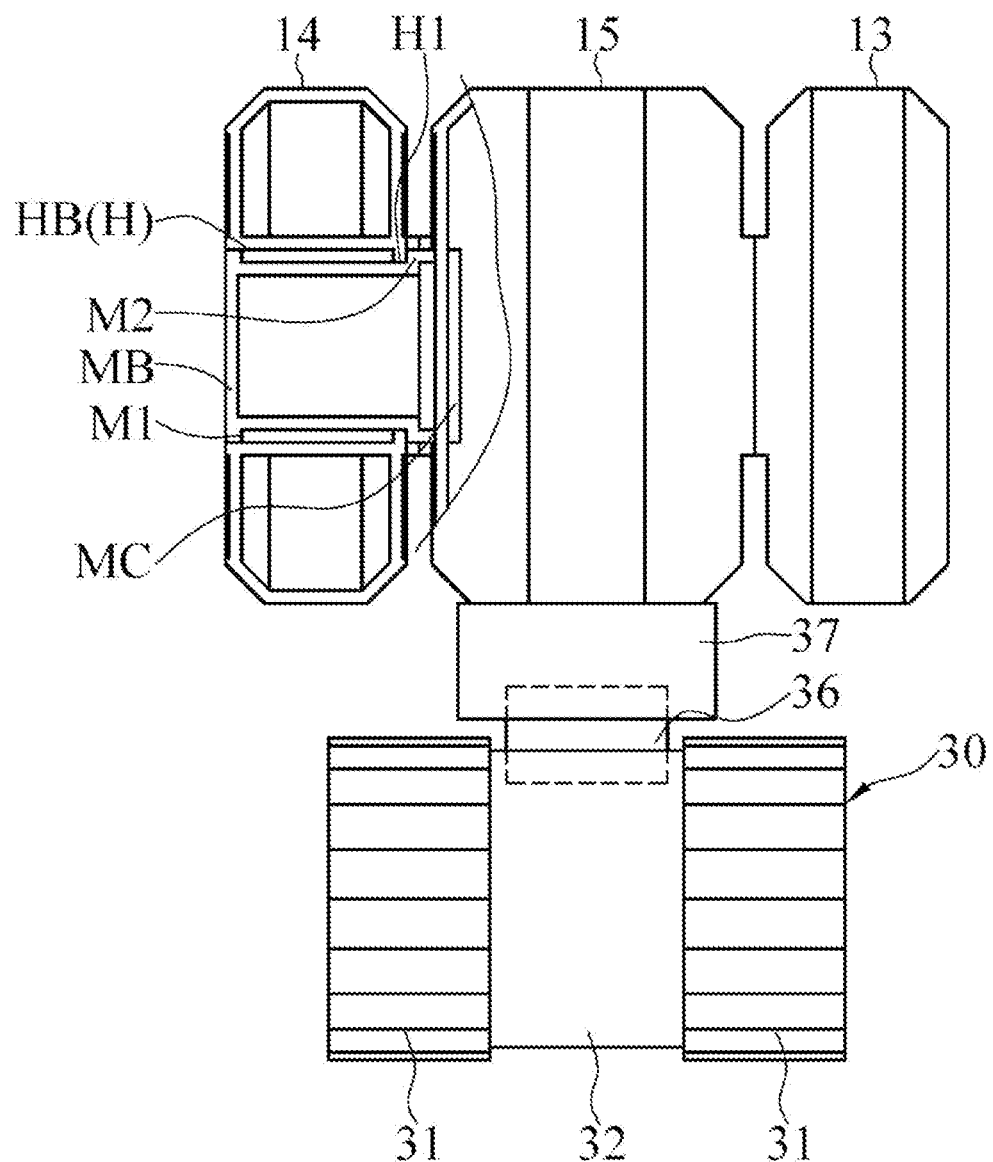
FIG. 3 is a cross-sectional view of the embodiment of FIG. 2.
Figure 7:
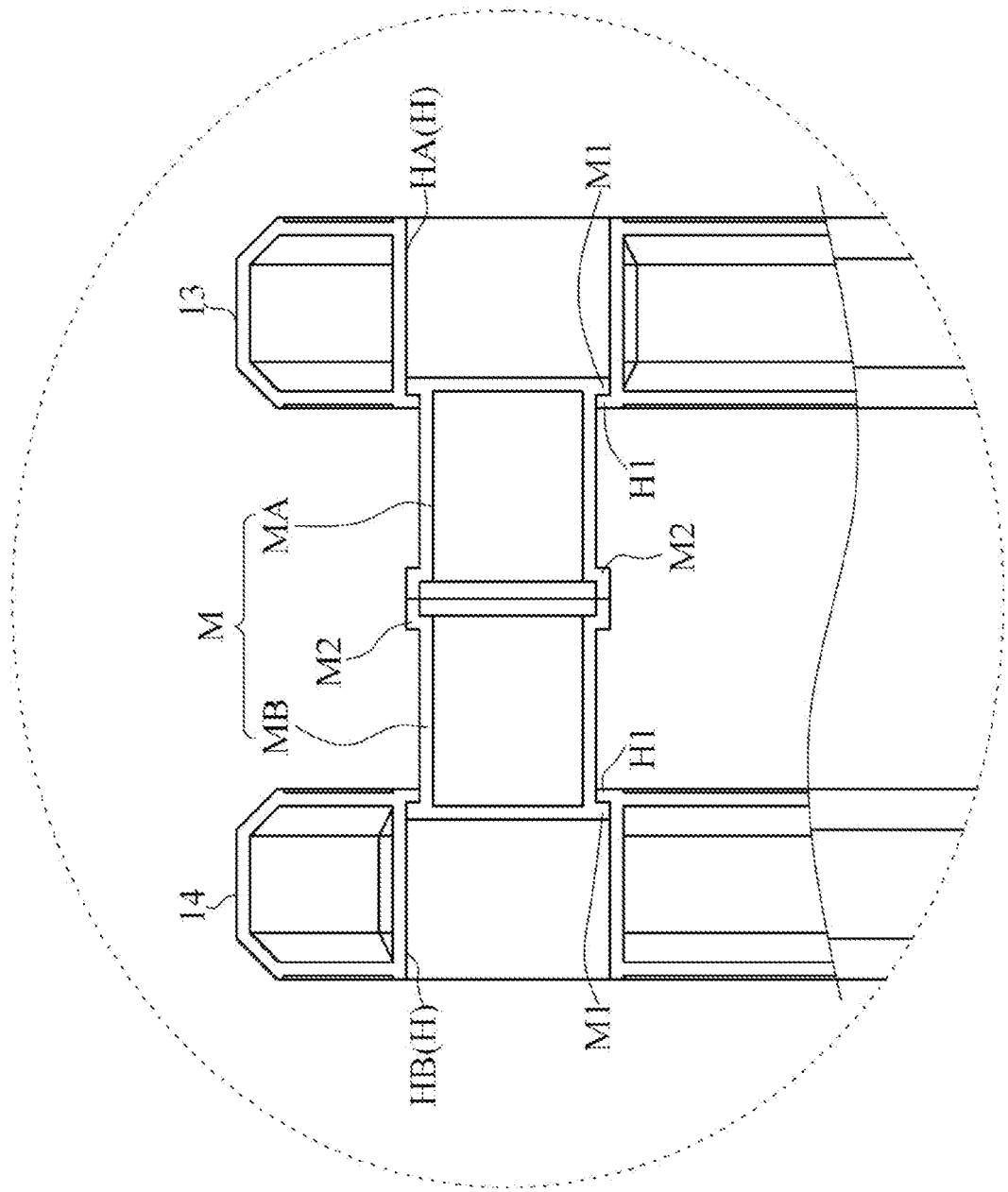
FIG. 7 is a partial enlarged view of FIG. 6.

Further, referring to FIG. 3 and FIG. 7, FIG. 3 is a schematic view of partial section of the second side element 14 and the third side element 15 when the warning sign device is in the closing state. FIG. 7 is a partial section state view of FIG. 6. In order to make the figures of various embodiments of the disclosure more clear, no section line is shown in cross-sectional views of FIG. 3 and FIG. 7. Interpretation of its figures should take what is defined by simple illustration of the figures and content of the embodiment as criterion. Also, a showing manner of the cross-sectional view without the section line should not affect interpretation when it is the cross-sectional view. One end of each via hole H is provided with a flange H1, and two ends of each magnetic element M are respectively provided with a first against edge M1 and a second against edge M2.

In an embodiment, the first against edge M1 of the first magnetic element MA is located between two ends of the first via hole HA, and the flange H1 of the first via hole HA is located between the first against edge M1 and the second against edge M2 of the first magnetic element MA. The first against edge M1 of the second magnetic element MB is located between two ends of the second via hole HB, and the flange H1 of the second via hole HB is located between the first against edge M1 and the second against edge M2 of the second magnetic element MB.

In an embodiment, when the sign body 10 is in the closing state, the magnetic element M draws back into the via hole H, and the second against edge M2 of the magnetic element M is against one side, facing an exterior of the via hole H, of the flange H1, and therefore the first side element 13 and the second side element 14 are close to the third side element 15 as much as possible so as to reduce the dimension of the sign body 10. When the other end of the first side element 13 is overlapping and connected with the other end of the second side element 14, there is a thickness of the third side element 15 between the first side element 13 and the second side element 14 and the first magnetic element MA and the second magnetic element MB are pushed and moved toward each other. Therefore, the first magnetic element MA and the second magnetic element MB respectively stretch out from the first via hole HA and the second via hole HB to connected with each other. Herein, the first against edge M1 of the first magnetic element MA is against one side, facing an interior of the first via hole HA, of the flange H1 so as to avoid that the first magnetic element MA disengages from the first via hole HA. The first against edge M1 of the second magnetic element MB is against one side, facing an interior of the second via hole HB, of the flange H1 so as to avoid that the second magnetic element MB disengages from the second via hole HB.

Referring to FIG. 3, in order to stabilize the sign body 10 in the closing state, a third magnetic element MC is disposed in a position, corresponding to the first side element 13 and the second side element 14, of the third side element 15. When the sign body 10 in the closing state, the first side element 13, the second side element 14 and the third side element 15 are fixed by connecting the third side element 15 with the first side element 13 or the second side element 14.

Figure 8:
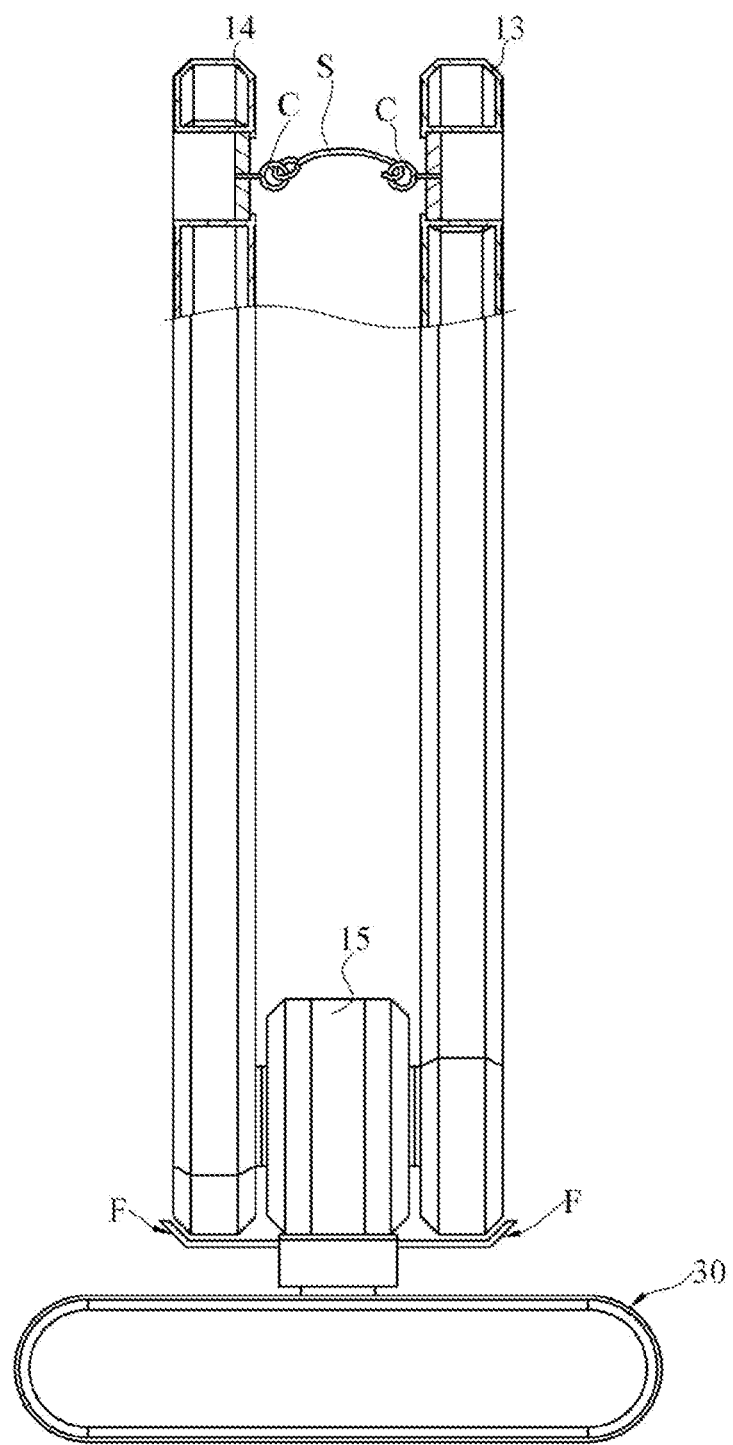
FIG. 8 is a cross-sectional view of a still another embodiment of the warning sign device of the invention.

In one embodiment, referring to FIG. 8, the first side element 13 the second side element 14 are connected and fixed with each other by a hook body S. Herein, the other end of the first side element 13 and the other end of the second side element 14 are respectively provided with a ring C in the overlapping position. One end of the hook body S inseparably connects the ring C on the second side element 14, the other end of the hook body S is in a hook shape so as to be hooked the ring C of the first side element 13.

In the foregoing embodiment, the hook body S is made of hard metal or plastic. In another embodiment, an elastic rope is between two ends of the hook body S. When the hook body S is not hooked the first side element 13, the elastic rope is not stretched. When the hook body S is stretched to hook the ring C of the first side element 13 by a tensile force, the first side element 13 and the second side element 14 are stably connected with each other by a restoring force of the elastic rope.

Continuing to refer to FIG. 8, in order to stabilize the sign body 10 in the closing state, the two sides of the third side element 15 respectively include a bearing element F with L-shaped for bearing the first side element 13 and the second side element 14 in the closing state. Continuing to refer to FIG. 2 and FIG. 4, in an embodiment, the sign body 10 is disposed on the base body 32 of the continuous track assembly 30 by the third side element 15. In the embodiment, the number of the continuous track assembly 30 as shown in FIG. 2 is two, and the number of the continuous track assembly 30 is one as shown in FIG. 1, it is known that the number of the continuous track assembly 30 is not limited herein.

Further, referring to FIG. 4, the continuous track assembly 30 is pivotally disposed on the sign body 10. Specifically, the sign body 10 is pivotally disposed on the base body 32 by a pivot 36. In an embodiment, the continuous track assembly 30 moves in a moving direction, and the continuous track assembly 30 rotates to a state in which an angle exists between the moving direction and the long side of the third side element 15 or rotates to another state in which the moving direction is parallel with the long side of the third side element 15.

In one embodiment, continuing to refer to FIG. 3 and FIG. 4. In order to assemble the sign body 10 and the continuous track assembly 30 easily, the warning sign device further includes a supporting element 37. In an embodiment, the third side element 15 of the sign body 10 is fixedly combined on one side of the supporting element 37, and the base body 32 of the continuous track assembly 30 is then pivotally disposed on the other side of the supporting element 37 by the pivot 36. Thus, when a user needs to replace the sign body 10, the user just need to dismount the sign body 10 from the supporting element 37.

Figure 2:
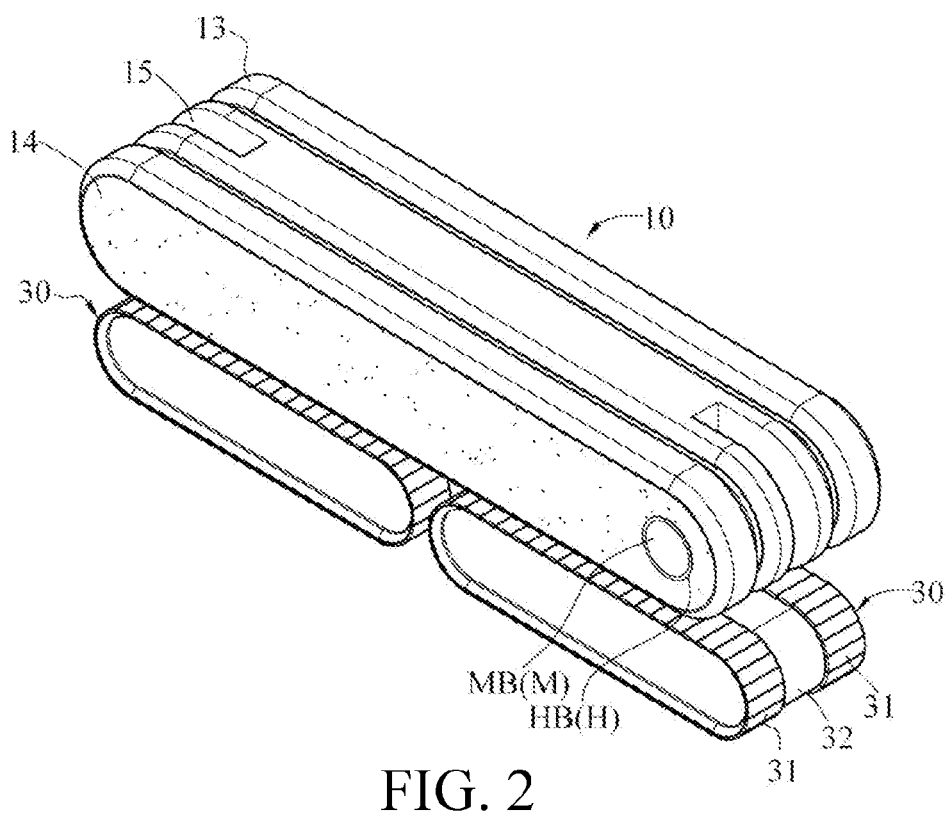
FIG. 2 is a schematic view of another embodiment of the warning sign device of the invention.

Further, referring to FIG. 2, a length of the continuous track assembly 30 is smaller than the length of the third side element 15, thus, when the continuous track assembly 30 rotates to that the moving direction is parallels the long side of the third side element 15, the third side element 15 covers the continuous track assembly 30. Thus, the warning sign device has minimum dimension when the warning sign device is in the closing state.

Therefore, when the warning sign device is in the closing state, the first side element 13, the second side element 14 and the third side element 15 are rotated to overlap each other, and the warning sign device is collected conveniently. Furthermore, since the continuous track assembly 30 has large contact surface for contacting the ground, the ground gripping force of the continuous track assembly 30 is improved. Therefore, whether the continuous track assembly 30 is moving or staying in a position, the warning sign device is stable.

Further, referring to FIG. 4, the continuous track assembly 30 further comprises a driving element 35 connected with a continuous track 31 to drive the continuous track 31. In one embodiment, the driving element 35 is a motor, the driving element 35 is disposed on the base body 32, the driving element 35 is provided with a driving shaft 351, and the driving shaft 351 is fixedly connected to a rotating wheel 33. Whereby, when the driving element 35 is enabled, the driving shaft 351 rotates and drives the rotating wheel 33 to rotate, and then the rotating wheel 33 rotates and drives the continuous track 31. In an embodiment, when the single driving element 35 drives one rotating wheel 33 to rotate and drive the continuous track 31, the other rotating wheel 33 is also driven to rotate by the continuous track 31.

In an embodiment, the continuous tracks 31 located on two sides of the base body 32 are respectively provided with the rotating wheel 33, where the rotating wheels 33 on the two sides of the base body 32 are interlacedly arranged, and each of the rotating wheels 33 on the two sides of the base body 32 is provided with a driving element 35. In other embodiment, the continuous track assembly 30 is only provided with the single driving element 35 to drive the other rotating wheel 33 and an idle wheel 34 to rotate.

Herein, the rotating wheel 33, the idle wheel 34 and the driving element 35 of the continuous track assembly 30 are disposed in the continuous track 31, so that overall appearance of the continuous track 31 is more concise and minimized.

Then, in one embodiment, also referring to FIG. 4, the warning sign device further includes an electric power module 40 electrically connected with the driving element 35 to provide power for the driving element 35. Herein, the electric power module 40 comprises a battery 41 and a charger 42, the battery 41 is electrically connected with the driving element 35, and the charger 42 is electrically connected with the battery 41 and contained in the third side element 15. Hereby, the battery 41 provides power for the driving element 35, and the charger 42 repeatedly charges the battery 41.

Further, in an embodiment, the third side element 15 of the sign body 10 is a hollow structure, and the electric power module 40 is disposed in the third side element 15 of the sign body 10. Hereby, a distance between the electric power module 40 and the driving element 35 is shortened as much as possible, and stability of the structural are improved. Besides, because of the weight of the charger 42 and the battery 41, a gravity center of the whole warning sign device is concentrated in a lower position of the sign body 10 which close to the continuous track assembly 30 when the electric power module 40 is disposed in the third side element 15. Therefore, the warning sign device stands more stable.

Moreover, in one embodiment, the warning sign device further includes a processor 50 and a wireless communication module 60. The processor 50 is electrically connected with the driving element 35 and the warning element 20 so as to control the warning element 20 to operate and drive the continuous track assembly 30. The wireless communication module 60 is electrically connected with the processor 50 so as to wirelessly control the processor 50.

Herein, the wireless communication module 60 is connected to an intelligent electronic device wirelessly, thus the user controls the warning element 20 and the driving element 35 by controlling the processor 50 through the intelligent electronic device. In an embodiment, the intelligent electronic device connects with the processor 50 of the warning sign device through an application (APP) to operate the warning sign device. The wireless communication module 60 supports, but not limited to, wireless fidelity (WIFI) communication. The intelligent electronic device is, but not limited to, a smart phone or a tablet personal computer. Whereby, the user wirelessly controls the warning action or movement of the warning sign device in a safe place which is away from where the warning sign device located at, such as the accident scene, and reduces the risk of accident involving persons from overtaking collision by coming vehicles.

Besides, the warning element 20 is implanted or equipped with light emitting elements (not shown in figures) and electrically connected with the processor 50 of the warning element 20. The processor 50 controls a light emitting speed, frequency or lighting position. In an embodiment, the processor 50 controls part of the warning element 20 to emit light, the warning element is arranged into characters or symbols, and hereby a warning effect is further improved.

Besides, referring to FIG. 4, the warning sign device further includes an image capturing device 70 (such as a camera and a video camera). The image capturing device 70 is electrically connected with the processor 50. In one embodiment, the image capturing device 70 is disposed on the sign body 10. Whereby, the image capturing device 70 captures an actual road condition image and an ambient environment image of a position where the warning sign device is located on, and transmits the images to the processor 50. The processor 50 then transmits the images to the intelligent electronic device through the wireless communication module 60, for the user to monitor the actual road condition through the intelligent electronic device. In other embodiments, the image capturing device 70 uploads the captured image to a cloud server through the wireless communication module 60 for other users to watch.

The above-described embodiments and/or implementations are merely illustrative of preferred embodiments and/or implementations for practicing the techniques of the disclosure, and are not intended to limit the embodiments of the techniques of the disclosure in any manner, and any person skilled in the art may make various variations or modifications to obtain other equivalent embodiments without departing from the scope of the technical means disclosed herein, and all such embodiments should still be considered to be substantially the same techniques or embodiments as the disclosure.

What is claimed is:

1. A warning sign device, comprising:
    a sign body, comprises a first side element, a second side element and a third side element, one end of the first side element and one end of the second side element are pivotally disposed at two ends of the third side element and located on two opposite sides of the third side element respectively; and
    two continuous track assembly, pivotally disposed at the third side element of the sign body respectively, wherein the two continuous track assemblies move toward a moving direction, wherein the moving direction is perpendicular to a length direction of the third side element when the two continuous track assemblies rotate to be perpendicular to the length direction of the third side element, the moving direction is parallel with the length direction of the third side element and the two continuous track assemblies are overlapping with the third side element when the two continuous track assemblies rotate to be parallel with the length direction.

2. A warning sign device, comprising:
    a sign body; and
    at least one continuous track assembly, comprises two continuous tracks and a base body, the two continuous tracks are rotatable and disposed on two sides of the base body, the sign body is disposed on the base body.

3. The warning sign device according to claim 2, further comprising a warning element disposed on the sign body.

4. The warning sign device according to claim 2, wherein the sign body has three side edges, the three side edges are connected to form a triangle, and the continuous track assembly is disposed on one of the three side edges.

5. The warning sign device according to claim 2, further comprising an image capturing device disposed on the sign body.

6. The warning sign device according to claim 2, further comprising a wireless communication module disposed on the sign body.

7. The warning sign device according to claim 2, wherein the sign body comprises a first side element, a second side element and a third side element, one end of the first side element and one end of the second side element are pivotally disposed at two ends of the third side element and located on two opposite sides of the third side element respectively, the other ends of the first side element and the second side element are separately connected each other, and a triangle is formed when the first side element and the second side element are connected.

8. The warning sign device according to claim 7, wherein the other end of the first side element is provided with a first magnetic element, the other end of the second side element is provided with a second magnetic element with magnetism different from that of the first magnetic element, and the other ends of the first side element and the second side element are separately connected through the first magnetic element and the second magnetic element.

9. The warning sign device according to claim 7, further comprising a hook body, wherein the first side element and the second side element are respectively provided with a ring, the ring of the second side element is hooked by one end of the hook body, and the ring of the first side element is hooked by the other end of the hook body.

10. The warning sign device according to claim 7, wherein the third side element of the sign body is pivotally disposed on the base body.

11. The warning sign device according to claim 10, further comprising a supporting element, wherein the number of the continuous track assemblies is two, the third side element is connected with one side of the supporting element, and the base body is pivotally disposed on the other side of the supporting element.

12. The warning sign device according to claim 2, further comprising a driving element connected with the continuous track assembly, the driving element is configured to driver the continuous track assembly.

13. The warning sign device according to claim 12, further comprising a battery electrically connected with the driving element.

14. The warning sign device according to claim 13, wherein the battery is contained in the third side element.

15. The warning sign device according to claim 13, further comprising a charger electrically connected with the battery.

16. A warning sign device, comprising:
    a sign body, comprises a first side element, a second side element and a third side element, one end of the first side element and one end of the second side element are pivotally disposed at two ends of the third side element and located on two opposite sides of the third side element respectively, wherein the other end of the first side element is provided with a first via hole, the other end of the second side element is provided with a second via hole, a first magnetic element is movably disposed in the first via hole and a second magnetic element is movably disposed in the second via hole, the first side element and the second side element are separately connected through the first magnetic element and the second magnetic element, and at least one continuous track assembly, disposed on the sign body.

17. The warning sign device according to claim 16, wherein one of two ends of the first via hole is provided with a flange, two ends of the first magnetic element are respectively provided with a first against edge and a second against edge, the first against edge of the first magnetic element is located between the two ends of the first via hole, and the flange is located between the first against edge and the second against edge of the first magnetic element.

18. The warning sign device according to claim 16, wherein one of two ends of the second via hole is provided with a flange, two ends of the second magnetic element are respectively provided with a first against edge and a second against edge, the first against edge of the second magnetic element is located between the two ends of the second via hole, and the flange is located between the first against edge and the second against edge of the second magnetic element.

\* \* \* \* \*